United States Patent [19]
Graafsma

[11] 4,000,880
[45] Jan. 4, 1977

[54] SCREW JACK

[75] Inventor: Richard S. Graafsma, Benton Harbor, Mich.

[73] Assignee: Auto Specialties Manufacturing Company, St. Joseph, Mich.

[22] Filed: Nov. 24, 1975

[21] Appl. No.: 634,854

Related U.S. Application Data

[60] Division of Ser. No. 544,384, Jan. 27, 1975, abandoned, which is a continuation-in-part of Ser. No. 464,362, April 26, 1974, abandoned.

[52] U.S. Cl. ............................................. 254/103
[51] Int. Cl.² ......................................... B66F 3/16
[58] Field of Search ...... 254/103; 74/417, 424.8 R; 29/159.2

[56] References Cited
UNITED STATES PATENTS 1,694,243  12/1928  Wilford ............................. 254/103
2,107,715  2/1938  Runyan et al. ..................... 254/103
2,254,085  8/1941  Nilson ............................... 254/103

*Primary Examiner*—James L. Jones, Jr.
*Assistant Examiner*—Robert C. Watson
*Attorney, Agent, or Firm*—Olson, Trexler, Wolters, Bushnell & Fosse, Ltd.

[57]  ABSTRACT

A powdered metal gear is disclosed for use in an accommodating screw jack. The gear has a planar face, and teeth of generally truncated tetrahedronal shape are disposed around the circumference. A conical gear undersurface acts, with intertooth recesses, to form a first gear portion of substantially uniform material thickness. Scallop indentations in the undersurface mate with the gear teeth themselves to form a second gear portion of substantially uniform material thickness.

7 Claims, 7 Drawing Figures

SCREW JACK

This is a Division, of application Ser. No. 544,384, filed Jan. 27, 1975, now abandoned, which was a continuation-in-part of application, Ser. No. 464,362 filed 4/26/74, now abandoned.

BACKGROUND OF THE INVENTION

This invention relates generally to screw jacks and the like, and more particularly concerns gear members for use in the operation of such jacks.

It is the general object of the present invention to provide an improved gear for use in screw jacks and like mechanisms.

It is a more specific object of the invention to provide a screw member drive gear for screw jacks or like mechanisms which has a relatively good surface finish and relatively precise finished dimensions.

Another object of the invention is to provide a gear for driving a screw jack screw member or like mechanism which is formed of powdered metal, and which has a long service life. A related object is to provide such a gear which also has relatively uniform material density in the tooth, as well as in other portions of the gear. An ancillary object is to provide such a gear which is formed to mate with a maximized number of related screw jack parts without requiring specially altered mating part design.

A further object is to provide a gear for use in screw jacks and the like which can be manufactured without the usual machining and heat treating operations.

Other objects and advantages of the invention will become apparent upon reading the following detailed description and upon reference to the drawings. Throughout the description, like reference numerals refer to like parts.

Detailed Description of the Illustrated Embodiment

While the invention will be described in connection with a preferred embodiment, it will be understood that it is not intended to limit the invention to this embodiment. On the contrary, it is intended to cover all alternatives, modifications and equivalents as may be included within the spirit and scope of the invention.

Figure 1:
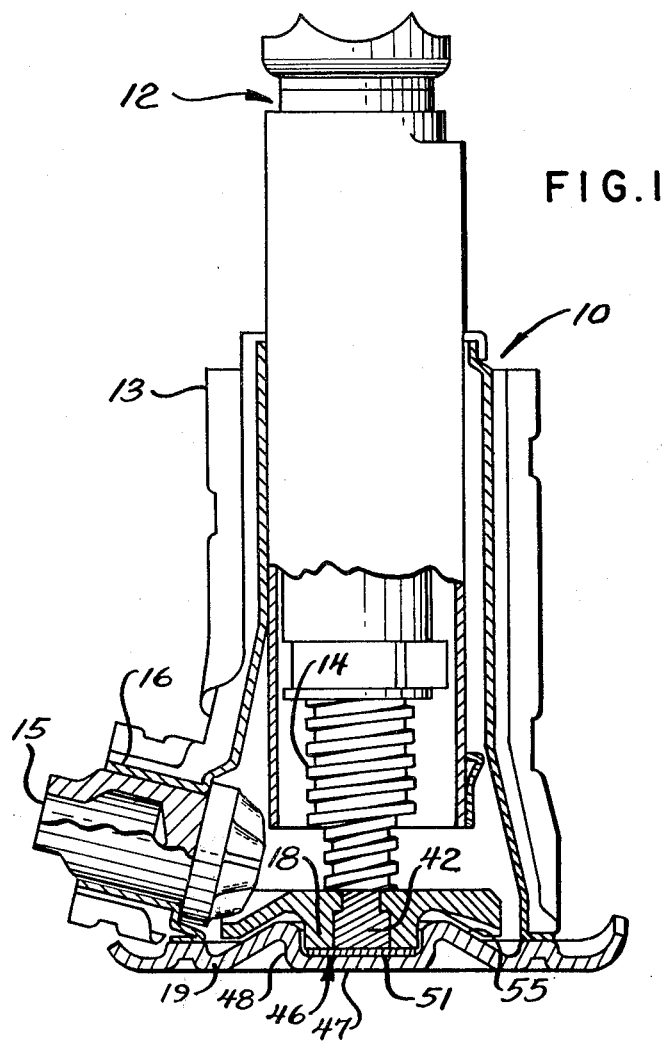
FIG. 1 is an elevational view of a typical screw member jack used for lifting automobiles and the like, bottom portions of the jack member being shown in cutaway and sectional aspects for clarity.
Figure 4:
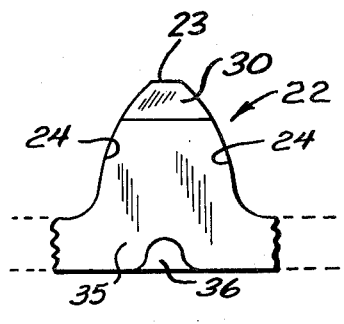
FIG. 4 is a fragmentary elevational view taken substantially in the plane of line 4—4 in FIG. 2 and showing in elevational aspect a typical gear tooth.

Turning first to FIG. 1, there is shown a screw jack 10 embodying the present invention. To lift automobile underframes or other loads (not shown) a load-engaging member 12 is mounted for at least partial extension from or retraction into a housing 13. This housing 13 can be formed by stamping, by die casting, or by other known methods. In the illustrated embodiment, extensive or retractive motion of the load member 12 is caused by a rotatable screw member 14 appropriately mounted within the housing 13. Rotation of the screw member 14 is caused, in turn, by a gear drive train which includes a pinion side gear 15, here carried in an appropriate jack housing journal 16. This side gear 15 may be manufactured by cold forming or other known means, and engages and turns a novel bottom gear 18 which is fixed to the screw member 14 for common bottom gear-screw member rotation.

The housing 13 and at least parts of the bottom gear 18 are supported on a base plate 19 which is adapted to rest upon the ground or another foundation surface (not shown). Gear rotating means such as a jack handle (not shown) can be applied to the pinion gear 15 to permit the jack operator to easily use the jack and raise or lower the supported load.

In accordance with one aspect of the invention, this screw member drive gear 18 is formed of powdered metal; this part formation process permits precise dimensional control and good surface finish at relatively low cost. To obtain long part service life and good part performance in further accordance with the invention, it has been found helpful to form the gear 18 with constituent metal thicknesses which are relatively uniform.

Figures 2, 3:
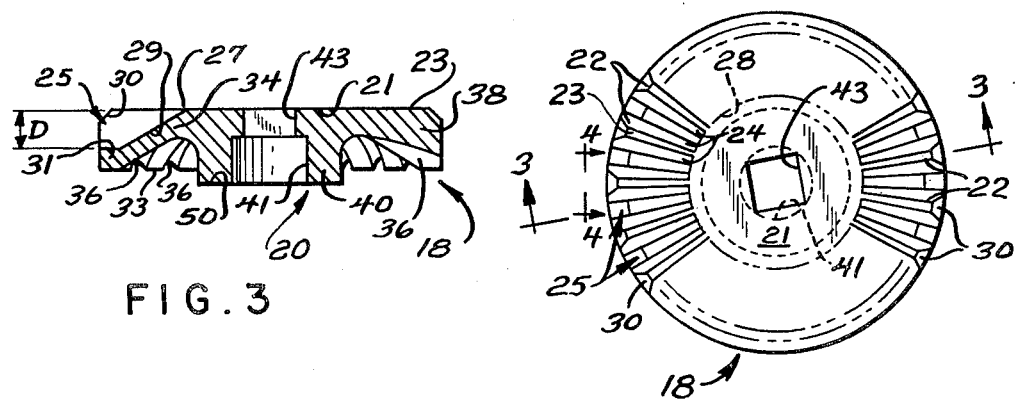
FIG. 2 is a top plan view of the novel screw member drive gear of the present invention.
FIG. 3 is a sectional view of the gear member taken substantially in the plane of line 3—3 in FIG. 2.
Figure 5:
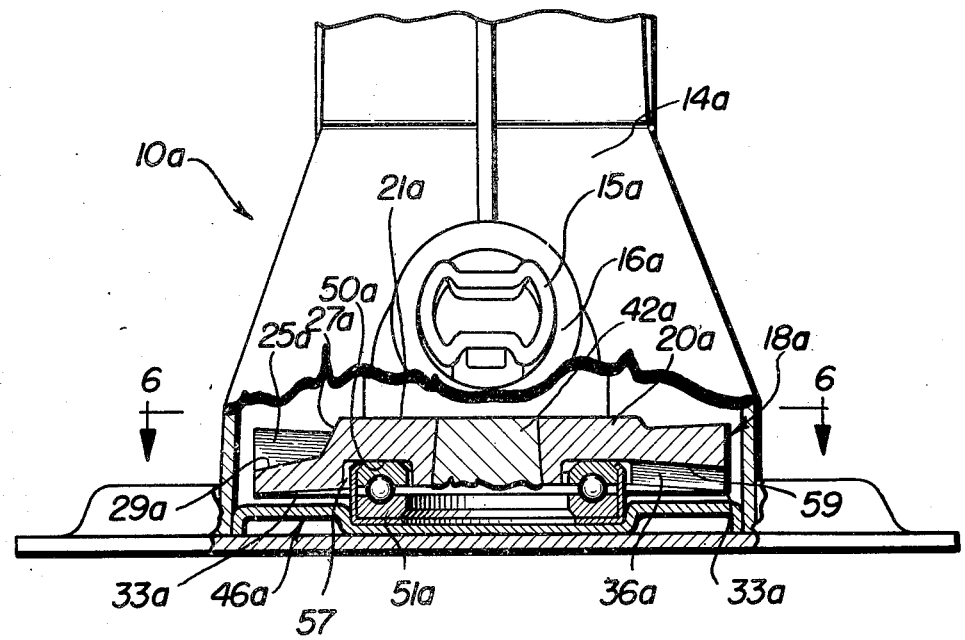
FIG. 5 is a fragmentary elevational view partially broken away showing a modified form of the present invention.
Figure 6:
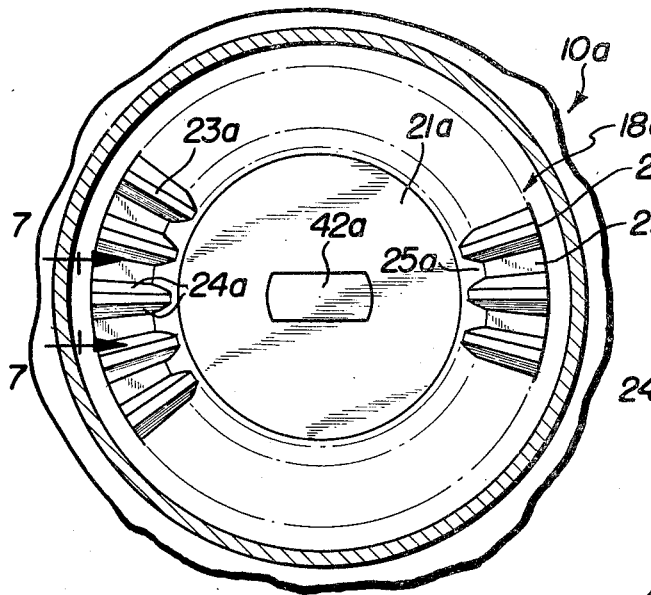
FIG. 6 is a sectional view taken along line 6—6 in FIG. 5.
Figure 7:
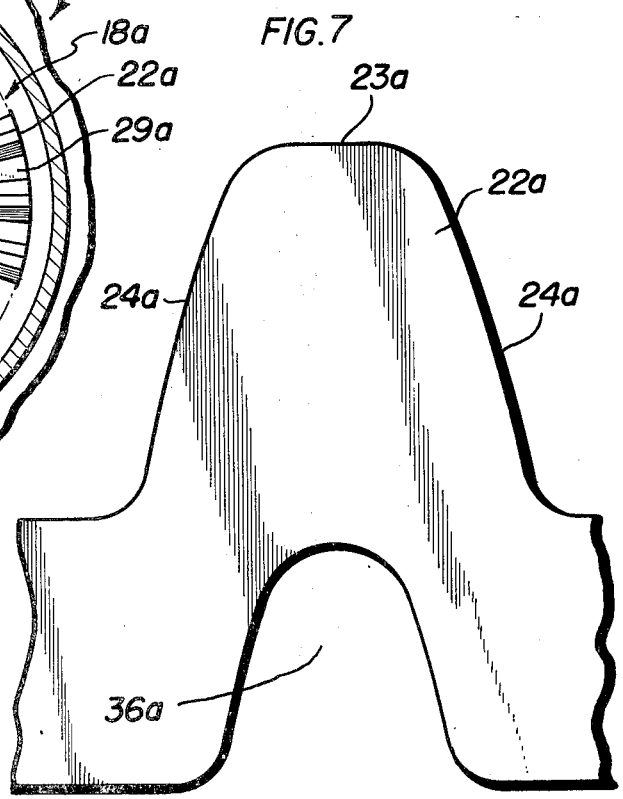
FIG. 7 is an enlarged fragmentary view taken along line 7—7 in FIG. 6.

As shown particularly in FIGS. 2 and 3, the gear is provided with a hub portion 20 having planar top surfaces 21 and a bottom surface 50. Radially elongated teeth 22 of tetrahedronal shape are formed integrally with and radiate from the circumference of the gear hub. In this embodiment, these teeth 22 preferably do not extend above the gear top 21 as in some crown gears, but, rather, each tooth 22 is at least partially defined by a crest surface 23 preferably generally parallel to or providing extension of the planar gear top 21. Moreover, the sides or flanks 24 of the teeth 22 are at least partially defined by recesses 25 which are of generally triangular elevational cross-section, as best seen in FIG. 3. Each recess 25 and its elevational cross-section can be considered to originate at a tip 27 which is located upon a small circle 28 on the planar gear face 21, as shown in FIG. 2. Adjacent teeth are separated from each other by recess bottom surfaces 29, the depth of which gradually increases as it moves toward the outer gear circumference to a maximum depth D, here located radially outside the small originating circle 28, as shown in FIGS. 2 and 3.

To assist in gear formation and long tooth life, each illustrated tooth 22 is provided with a bevelled tip 30. Where necessary, tooth root extensions 31 oriented generally parallel to the gear face 21 are provided to increase tooth structure for interengagement with the mating pinion side gear 15.

A uniform gear material thickness is provided in further accordance with the invention by constructing the gear 18 with an undersurface 33 generally parallel to the bottom surfaces 29 of the recess 25. In this embodiment the surface 33 is of generally truncated conical shape. Thus, undersurface 33 generally parallels the sloping or tapered surfaces 29 of the recesses 25 to form, between each recess taper 25 and the gear underside 33, a portion 34 of the gear 18 which is conical and yet is substantially uniform in material thickness.